S. GALIK.
AUTOMATIC GRAVITY HEADLIGHT.
APPLICATION FILED JULY 2, 1918.
1,285,673.
Patented Nov. 26, 1918.
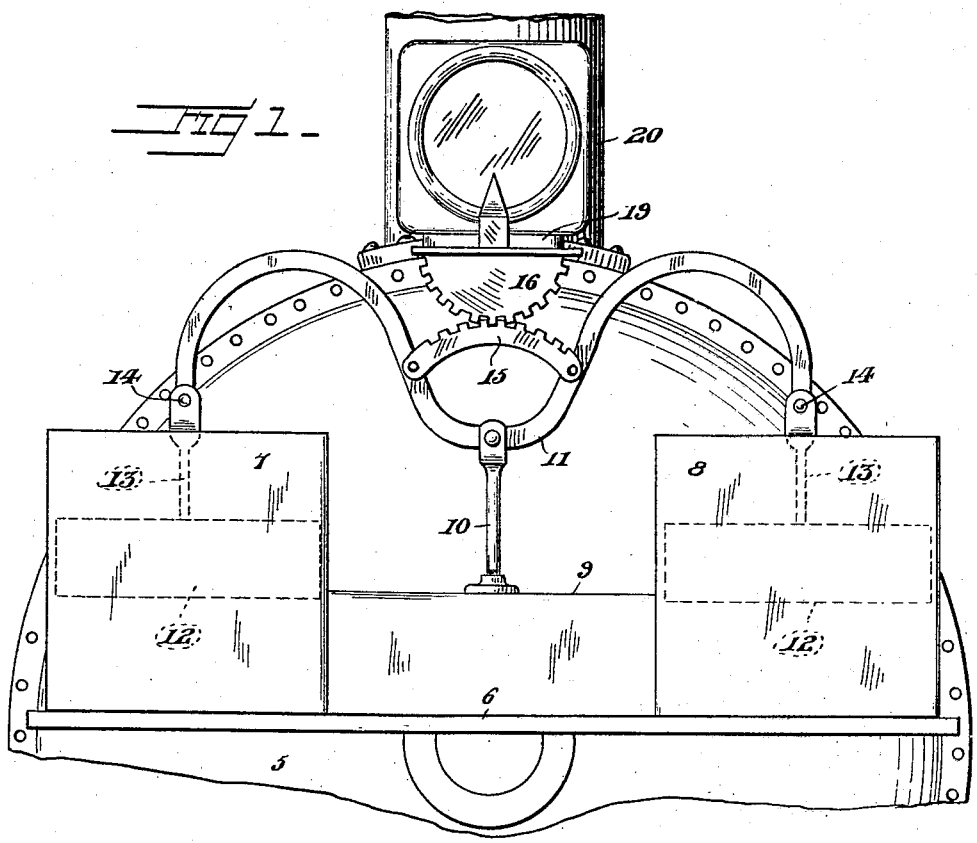
Inventor
S. Galik
By A. M. Wilson
Attorney

UNITED STATES PATENT OFFICE.

STIVE GALIK, OF ITHACA, NEW YORK.

AUTOMATIC GRAVITY-HEADLIGHT.

1,285,673.                Specification of Letters Patent.        Patented Nov. 26, 1918.

Application filed July 2, 1918.   Serial No. 243,009.

*To all whom it may concern:*

Be it known that I, STIVE GALIK, a subject of the King of Hungary, residing at Ithaca, in the county of Tompkins and State of New York, have invented certain new and useful Improvements in Automatic Gravity-Headlights, of which the following is a specification.

This invention relates to improvements in automatic headlights particularly adapted for locomotives and is of such construction that the light will be moved, according to the curvature of the railway tracks, whereby the light will show directly ahead of the locomotive along the track regardless of whether the track be straight or curved.

A further object of the invention is the provision of an automatic dirigible locomotive headlight actuated by fluid and floats so that the light rays may be directed upon the tracks regardless of whether they are straight or curved.

With these and other objects in view, the invention consists in the novel combination and arrangement of parts hereinafter more fully described and set forth in the claim hereto appended.

In the drawings:

Figure 1 is a fragmentary front elevation of a locomotive equipped with my improved gravity headlight; and Fig. 2 is a perspective view of the lamp supporting member.

Referring to the drawings, the numeral 5 indicates a locomotive boiler to the front of which is secured a transversely disposed supporting platform 6. Secured to the upper side of this platform near each end thereof are vertically extending tanks 7 and 8 respectively. The tanks are connected together by a hollow member 9 and this member establishes a communication between the respective tanks.

A standard 10 is secured centrally to and rises vertically from the member 9 and pivoted intermediate its ends to the upper end of the standard is a yoke 11. The free ends of the yoke are disposed over the central axis of the tanks 7 and 8, respectively.

A hollow float 12 is mounted in each tank and each float has secured to its upper side centrally thereof a vertically extending rod 13. The rods 13 are pivotally secured as at 14, to the respective ends of the yoke 11 so that upon oscillatory movement of the yoke the floats will move in their respective tanks.

An arcuate rack 15 is secured to the yoke 11 centrally thereof and meshing with the teeth of this rack are the teeth of the depending segment gear 16 which is rigidly carried by the forward end of the lamp supporting member 17.

The lamp supporting member 17 comprises a substantially rectangular bar having one end reduced as at 18, which reduced end is pivotally secured to the upper side of the boiler 5. The member 17 is provided adjacent its reduced end with laterally projecting portions 19 from opposite sides thereof and to which the headlight 20 is permanently secured. Upon movement of the floats in their respective tanks, movement will be imparted to the rack 15, which, in turn, will impart movement to the segment gear 16, supporting member 17 and headlight 20.

In practice the tanks are filled with a suitable fluid, such as water or the like and through the medium of the connecting member 9, the level in each tank will be identical. The floats will be positioned upon the upper surface of the fluid in their respective tanks and when the locomotive is making a curve the fluid will move from one tank to the opposite tank raising its respective float, consequently moving the headlight through the yoke, rack and segment gear.

Having thus described my invention, what I claim is:—

In combination, a locomotive, a platform secured thereto, tanks secured to said platform near each end thereof, a hollow member connected to and communicating with each of said tanks, floats movable in the tanks, a standard secured centrally to and rising vertically from said hollow member, a yoke pivotally secured intermediate its ends to the upper end of said standard, the respective ends of said yoke located over the central axis of said tanks, means pivotally connecting the floats to the respective ends of the yoke, a rack secured to said yoke, a supporting member having one end pivotally secured to the locomotive, a headlight secured to said supporting member, and a segment gear secured to the free end of the supporting member and meshing with the rack of the yoke for the purpose specified.

In testimony whereof I affix my signature.

STIVE GALIK.